(12) United States Patent
Evers et al.

(10) Patent No.: US 10,430,510 B2
(45) Date of Patent: Oct. 1, 2019

(54) METHOD FOR CONTROLLING ACCESS TO ELECTRONIC DOCUMENTS BASED ON STATELESS COMMUNICATION

(71) Applicant: SAP SE, Walldorf (DE)

(72) Inventors: Harald Evers, Walldorf (DE); Martin Zurmuehl, Muhlhausen (DE); Ralf Handl, Heidelberg (DE); Boris Hecker, St. Leon-Rot (DE); Jamila Schon, Heidelberg (DE)

(73) Assignee: SAP SE, Walldorf (DE)

( * ) Notice: Subject to any disclaimer, the term of this patent is extended or adjusted under 35 U.S.C. 154(b) by 616 days.

(21) Appl. No.: 14/656,796

(22) Filed: Mar. 13, 2015

(65) Prior Publication Data
US 2016/0253304 A1 Sep. 1, 2016

(30) Foreign Application Priority Data
Feb. 27, 2015 (EP) .................................. 15157017

(51) Int. Cl.
*G06F 17/24* (2006.01)
*H04L 29/08* (2006.01)
*G06F 16/957* (2019.01)

(52) U.S. Cl.
CPC ........ *G06F 17/243* (2013.01); *G06F 16/9574* (2019.01); *G06F 17/24* (2013.01); *H04L 67/142* (2013.01)

(58) Field of Classification Search
None
See application file for complete search history.

(56) References Cited

U.S. PATENT DOCUMENTS 5,991,760 A 11/1999 Gauvin et al.
7,523,391 B1 * 4/2009 Eizenhoefer ........ G06F 3/04895
707/999.1

(Continued)

OTHER PUBLICATIONS

Pautasso et al., "RESTful web services vs. Big web services: Making the right architectural decision", Proceedings of the 17th International Conference on World Wide Web, WWW 2008, Apr. 21, 2008, pp. 805-814, ISBN 978-1-60558-085-2.

(Continued)

*Primary Examiner* — Sanchita Roy
(74) *Attorney, Agent, or Firm* — Harness, Dickey & Pierce, P.L.C.

(57) ABSTRACT

The present disclosure relates to a telecommunication method for controlling data access to a telecommunication server, the telecommunication server being connected to at least one client terminal via at least a first digital cellular telecommunication network, wherein the telecommunication server and the client terminal communicate via a stateless protocol, the client terminal being a battery powered device. The method comprises providing an electronic document having a plurality of input fields for entry of a set of user data; storing by the telecommunication server a status parameter in association with the electronic document, the status parameter having a first, second or third value, the first value indicating a first state of the electronic document in which the electronic document is not filled, the second value indicating a second state of the electronic document in which the electronic document is filled with the set of user data, the third value indicating a third state of the electronic document in which the electronic document is being requested for modifying at least part of the set of user data.

16 Claims, 7 Drawing Sheets

(56) References Cited

U.S. PATENT DOCUMENTS

| | | | |
|---|---|---|---|
| 2003/0152901 A1 | 8/2003 | Altenhofen et al. | |
| 2005/0210263 A1* | 9/2005 | Levas | G06F 21/33 |
| | | | 713/182 |
| 2005/0262089 A1* | 11/2005 | Wu | G06F 17/3089 |
| 2008/0005657 A1* | 1/2008 | Sneh | G06F 17/243 |
| | | | 709/203 |
| 2008/0256128 A1* | 10/2008 | Pierce | G06F 19/363 |
| 2009/0150763 A1* | 6/2009 | Griffith | G06F 17/241 |
| | | | 715/230 |
| 2011/0225485 A1* | 9/2011 | Schnitt | G06F 17/243 |
| | | | 715/222 |
| 2011/0286037 A1* | 11/2011 | Hamada | G06F 9/5027 |
| | | | 358/1.15 |
| 2011/0314046 A1* | 12/2011 | Burckart | G06F 17/3089 |
| | | | 707/769 |
| 2013/0097479 A1* | 4/2013 | Zavaleta | G06F 17/243 |
| | | | 715/222 |

OTHER PUBLICATIONS

Hewlett-Packard et al.: "Web services architecture W3C working group note Feb. 11, 2004", www.w3.org/TR/ws-arch/wsa.pdf, Oct. 1, 2003, retrieved from the internet Jul. 31, 2015.

\* cited by examiner

METHOD FOR CONTROLLING ACCESS TO ELECTRONIC DOCUMENTS BASED ON STATELESS COMMUNICATION

FIELD OF THE INVENTION

The invention relates to computing systems, and more particularly to a method for controlling data access in a telecommunication server.

BACKGROUND

The Representational state transfer (REST) architectural systems require that all knowledge about prior communication between a client and a server is kept on the server and the client, or contained within the messages they exchange. Traditional data entry and data modification applications work on a temporary in-memory version of an electronic document which is persisted on the server once it is sufficiently complete and consistent. However, the life time of this temporary version is tied to a communication session between the client and the server.

SUMMARY

Various embodiments provide a method for controlling data access in a telecommunication server, a telecommunication system, a telecommunication server, a mobile telecommunication device and a computer program product as described by the subject matter of the independent claims. Advantageous embodiments are described in the dependent claims.

In one aspect, the invention relates to a telecommunication method for controlling data access to a telecommunication server, the telecommunication server being connected to at least one client terminal via at least a first digital cellular telecommunication network (the first telecommunication network), wherein the telecommunication server and the client terminal communicate via a stateless protocol, the client terminal being a battery powered device. The method comprises:

a) providing an electronic document a content of which comprises a plurality of input fields for entry of a set of user data;
   b) storing by the telecommunication server a status parameter in association with the electronic document, the status parameter having a first, second or third value, the first value indicating a first state of the electronic document in which the electronic document is not filled, the second value indicating a second state of the electronic document in which the electronic document is filled with the set of user data, the third value indicating a third state of the electronic document in which the electronic document is being requested for modifying at least part of the set of user data;
   c) receiving by the telecommunication server a request from the client terminal to access the electronic document;
   d) if the received request is a first request to access the electronic document setting by the telecommunication server the status parameter to the first value;
   e) in response to a determination that the status parameter has the first value:
      creating by the telecommunication server an initial draft document comprising content of the electronic document if the initial draft document is not created and assigning a first identification address to the initial draft document for accessing the initial draft document if the first identification address is not assigned to the initial draft document;
      displaying by the client terminal the initial draft document on the client terminal;
      receiving (in response to the displaying) by the telecommunication server from the client terminal user data, and saving the received user data in the initial draft document;
      in response to determining by the telecommunication server that the set of user data is completely received, setting by the telecommunication server the status parameter to the second value, copying by the telecommunication server the initial draft document into the electronic document, assigning by the telecommunication server a second identification address to the electronic document for access via the first telecommunication network to the electronic document, and deleting the initial draft document;
   f) in response to a determination that the status parameter has the second value or the third value:
      creating by the telecommunication server an edit draft copy of the electronic document if the edit draft copy is not created and assigning a third identification address to the edit draft copy for accessing the edit draft copy if the third identification address is not assigned to the edit draft copy, setting the status parameter to the third value if the status parameter has the second value;
      displaying by the client terminal the edit draft copy on the client terminal;
      receiving (in response to the displaying) by the telecommunication server modifications to the set of user data from the client terminal, modifying by the telecommunication server the edit draft document using the received modifications;
      in response to receiving a save or an activate modification request from the client terminal, setting by the telecommunication server the status parameter to the second value, copying by the telecommunication server the edit draft copy into the electronic document and deleting by the telecommunication server the edit draft copy;
   g) repeating steps c)-f) in one or more consecutive communication sessions between the client terminal and the telecommunication server using at least one of the first, second and third identification addresses.

In another aspect, the invention relates to a telecommunication system comprising a telecommunication server and a client terminal, the telecommunication server being connected to the client terminal via at least a first digital cellular telecommunication network, wherein the telecommunication server and the client terminal communicate via a stateless protocol, the client terminal being a battery powered device, wherein the telecommunication system is operable to execute the method as claimed in one of the preceding embodiment.

In another aspect, the invention relates to a computer program product comprising computer executable instructions to perform the method steps of the method of any one of the preceding embodiments.

In another aspect the invention relates to a mobile telecommunication device in communication with a telecommunication server via at least a first digital cellular telecommunication network, wherein the telecommunication server comprises an electronic document a content of which comprises a plurality of input fields for entry of a set of user data, the mobile telecommunication device being a battery powered device. The mobile telecommunication device is configured for:

sending a request to the telecommunication server to access the electronic document;

receiving from the telecommunication server and displaying by an initial draft document of the electronic document;

receiving user data entered in input fields of the initial draft document;

sending the user data to the telecommunication server;

receiving from the telecommunication server and displaying an edit draft copy of the electronic document;

receiving modifications entered and performed on data of input fields of the edit draft copy;

sending the modifications to the telecommunication server;

sending a save or an activate modification request to the telecommunication server.

In another aspect the invention relates to a telecommunication server in communication with at least one client terminal, the telecommunication server being connected to the client terminal via at least a first digital cellular telecommunication network, wherein the telecommunication server and the client terminal communicate via a stateless protocol. The telecommunication server is configured for:

providing an electronic document a content of which comprises a plurality of input fields for entry of a set of user data;

storing a status parameter in association with the electronic document, the status parameter having a first, second or third value, the first value indicating a first state of the electronic document in which the electronic document is not filled, the second value indicating a second state of the electronic document in which the electronic document is filled with the set of user data, the third value indicating a third state of the electronic document in which the electronic document is being requested for modifying at least part of the set of user data;

receiving a request from the client terminal to access the electronic document;

if the received request is a first request to access the electronic document setting the status parameter to the first value;

in response to a determination that the status parameter has the first value:

creating an initial draft document comprising content of the electronic document if the initial draft document is not created and assigning a first identification address to the initial draft document for accessing the initial draft document if the first identification address is not assigned to the initial draft document;

sending the initial draft document to the client terminal and controlling the client terminal to display the initial draft document;

receiving from the client terminal user data, and saving the received user data in the initial draft document;

in response to determining that the set of user data is completely received, setting the status parameter to the second value, copying by the telecommunication server the initial draft document into the electronic document, assigning a second identification address to the electronic document for access via the first telecommunication network to the electronic document, and deleting the initial draft document;

in response to a determination that the status parameter has the second value or the third value:

creating an edit draft copy of the electronic document if the edit draft copy is not created and assigning a third identification address to the edit draft copy for accessing the edit draft copy if the third identification address is not assigned to the edit draft copy, setting the status parameter to the third value if the status parameter has the second value;

sending the edit draft copy to the client terminal and controlling the client terminal to display the edit draft copy;

receiving modifications to the set of user data from the client terminal, modifying the edit draft document using the received modifications;

in response to receiving a save or an activate modification request from the client terminal, setting the status parameter to the second value, copying by the telecommunication server the edit draft copy into the electronic document and deleting the edit draft copy.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

DETAILED DESCRIPTION

Figure 1:
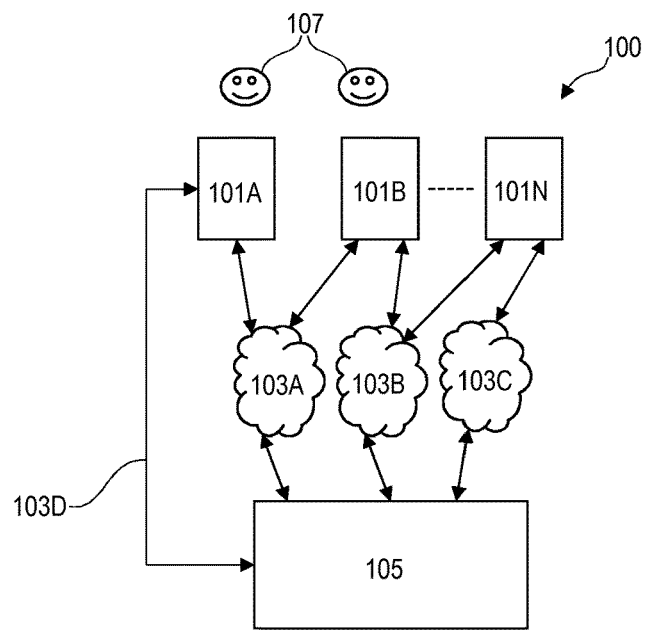
FIG. 1 is a representative view of a telecommunication system.

In the following, like numbered elements in the figures either designate similar elements or designate elements that perform an equivalent function. Elements which have been discussed previously will not necessarily be discussed in later figures if the function is equivalent.

The above features may have the advantage of controlling and securing access to electronic documents in that the changes or data inputs to an electronic document are temporarily made in draft documents (i.e. initial draft document and the edit draft copy). In this way, a user may only have direct access to the drafts and have no control on the electronic document (i.e. the user cannot change the electronic document). However, the original electronic document is only managed by the telecommunication server. This may increase the performance access to the electronic documents.

The term "telecommunication server" as used herein refers to a computer server that is connected to a digital cellular telecommunication network.

Another advantage may be that the present method may be seamlessly integrated in existing systems. The introduction of drafts is transparent to the user, since the user has access to the same functionalities as with existing systems e.g. same document structure, the way a document is displayed etc.

According to one embodiment, the receiving by the telecommunication server of the user data comprises: downloading the initial draft document at the client terminal; in response to determining that the client terminal is not connected to a network using a first portion of the first identification address for receiving at least part of the user data at the client terminal; forwarding the at least part of the user data to the telecommunication server via the first telecommunication network using a second portion of the first identification address, wherein the second portion comprises a network address generated in accordance with a communication protocol of the first telecommunication network.

This embodiment may be advantageous as it may further increase the performance access to the electronic document, by for example, avoiding multiple attempts to recreate and/or refill the electronic document after each disconnection of the network. This may result in saving of resources in the whole telecommunication system including the client terminal as well as the telecommunication server. For example, this may save resources in the client terminal as this may avoid multiple attempts to access the initial draft document and refill the initial draft document in case of a disconnection of the client terminal from the network. Also, the network bandwidth of the telecommunication system may be saved in the telecommunication system as the transmission of the data that may be caused by the refilling process may be avoided (this may also reduce the data traffic in the system).

According to one embodiment, the receiving by the telecommunication server of the user data is performed using the first identification address, wherein the first identification address comprises at least one of an address determined in accordance with a communication protocol of a second telecommunication network to which the client terminal and the telecommunication server are connected; a database entry associated with the initial draft document on the telecommunication server.

This may further increase the performance access to the electronic document in that alternative access methods are provided. For example, an offline direct access to the telecommunication server without need of a network connection may be provided using (e.g. an interactive (direct without network) access session to the telecommunication server and using the database entry associated with the initial draft document in order to fill input data in the initial draft document).

According to one embodiment, the first telecommunication network is a public network and wherein the second telecommunication network is a private intranet network.

This embodiment may further increase the performance access to the initial draft document as it may provide different technical alternative access methods such that the probability to lose access to the initial draft document is mitigated. This is in contrast to the case where the first and second telecommunication networks are both of the same technical nature e.g. public networks.

According to one embodiment, the receiving of the at least part of the user data at the client terminal is performed in multiple login sessions to the client terminal from a user of the client terminal.

A login session is the period of activity between a user logging in and logging out of the client terminal. This embodiment may further increase the performance access to the initial draft document.

According to one embodiment, the user data and/or the modifications to the set of user data are received concurrently from multiple client terminals. For example, the at least one client terminal may comprise multiple client terminals, wherein each client terminal of the client terminals is assigned a corresponding portion of the initial draft document to be filled by data received from that client terminal. Filling the initial draft document or the edit draft copy concurrently by the multiple client terminals may speed up the process of filling such documents.

According to one embodiment, determining by the telecommunication server that the set of user data is completely received is performed automatically or upon receiving a completion notification from the client terminal.

According to one embodiment, the second identification address comprises an URL for accessing the electronic document using the first telecommunication network. This may provide a seamless integration of the present method in existing systems.

According to one embodiment, the receiving by the telecommunication server of the modifications to the set of user data comprises: downloading the edit draft copy at the client terminal; in response to determining that the client terminal is not connected to a network using a first portion of the third identification address for receiving at least part of the modifications at the client terminal; forwarding the at least part of the modifications to the telecommunication server via the first telecommunication network using a second portion of the third identification address, wherein the second portion comprises a network address generated in accordance with a communication protocol of the first telecommunication network.

According to one embodiment, the method further comprises: determining by the client terminal that the first telecommunication network is an untrusted network and sending by the client terminal the modifications and/or the user data using the third and/or first identification address respectively, wherein the first and third identification addresses comprise addresses determined in accordance with a communication protocol of a second telecommunication network to which the client terminal and the telecommunication server are connected, wherein the second telecommunication network is a private network. The second telecommunication network is a private trusted network. This may further increase the secure aspect of the present invention by switching between networks to have access to the trusted one.

FIG. 1 is a representative view of a telecommunication system 100 in accordance with an example of the present disclosure. The telecommunication system 100 comprises one or more client terminals 101A-N. A client terminal 101A of the one or more client terminals 101A-N may comprise a mobile phone, a PDA (personal digital assistance), a notebook, a computer etc.

The client terminals 101A-N are connected to at least one telecommunication server 105 via one or more networks 103A-C. The networks 103A-C may include similar or dissimilar networks, mixed in any combination. For example, client terminal 101A is connected to the telecommunication server 105 via the network 103A, while the client terminal 101B is connected to the telecommunication server 105 via two networks 103A and 103B. In another example, the client terminal 101A-N may be connected directly e.g. via Ethernet link 103D to the telecommunication server 105.

A client terminal of the one or more client terminals 101A-N may include multiple physical interfaces, including at least one or more physical interface for each different network to which the client terminal is connected. And, the telecommunication server may have one or more physical interfaces for connecting to networks 103A-C.

Networks 103A-C may be different or same types of networks, such as, for example, an Ethernet network, a Multimedia over Coax Alliance (MoCA) network, a HomePNA (Home Phoneline Networking Alliance) network, an Ethernet over powerline network (HomePlug), a wireless network, 3G, EDGE, UMTS, LTE, or any other type of network enabling a client terminal 101A of the client terminals 101A-N to connect to the telecommunication server 105.

For example, the one or more client terminals 101A-N may form a front-end of the telecommunication system 100, wherein the front end may function as a portal in which front-end users 107 may access and edit back-end data on the telecommunication server 105.

The telecommunication server 105 and client terminals 101A-N may communicate via a stateless protocol such as the Open Data Protocol (OData) using HTTP or HTTPS. The stateless protocol is a communications protocol that treats each request (e.g. received via a client terminal 101A) as an independent transaction that is unrelated to any previous request so that the communication consists of independent pairs of request and one or more responses of the request (e.g. for one response for one request). A stateless protocol does not require the (stateless) client terminal 101A to retain session information or status about each communications partner for the duration of multiple requests; in particular no session information of the telecommunication server 105.

Figure 5:
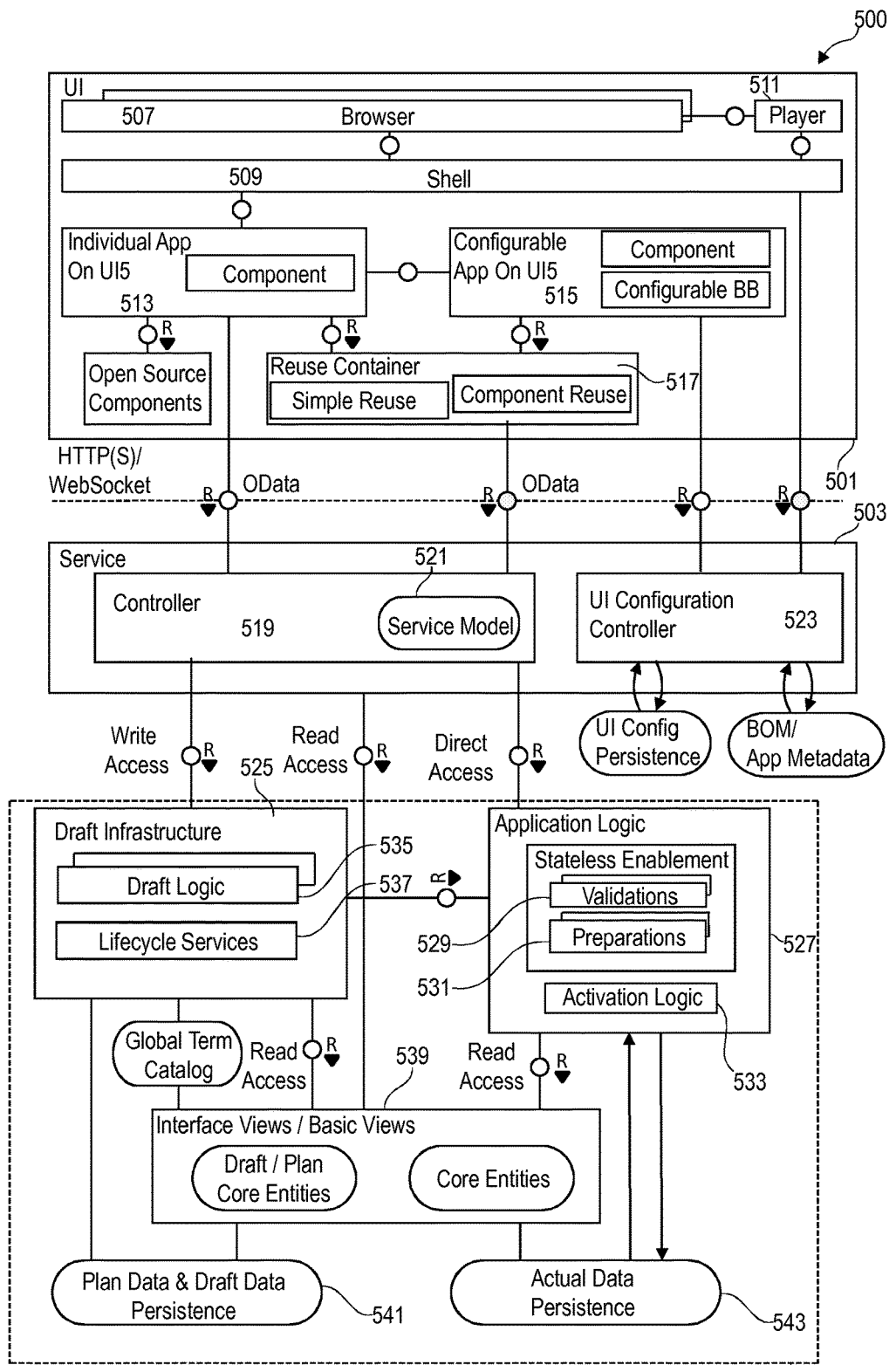
FIG. 5 depicts an exemplary telecommunication system.

In one example, the telecommunication system 100 may further include a middleware (not shown) that may function as a gateway and/or interface between the client terminals 101A-N and the telecommunication server 105. The middleware may for example be used for converting data requests from the client terminals 101A-N into requests recognizable or interpretable by the telecommunication server 105. The middleware function may be an intrinsic function of the telecommunication server 105 to convert or interpret the requests from the client terminals. For example, the middleware may include a user interface (UI) which may for example be HTML5 (SAPUI5). FIG. 5 shows an exemplary structure of a system that includes the middleware according to the present disclosure.

Figure 2:
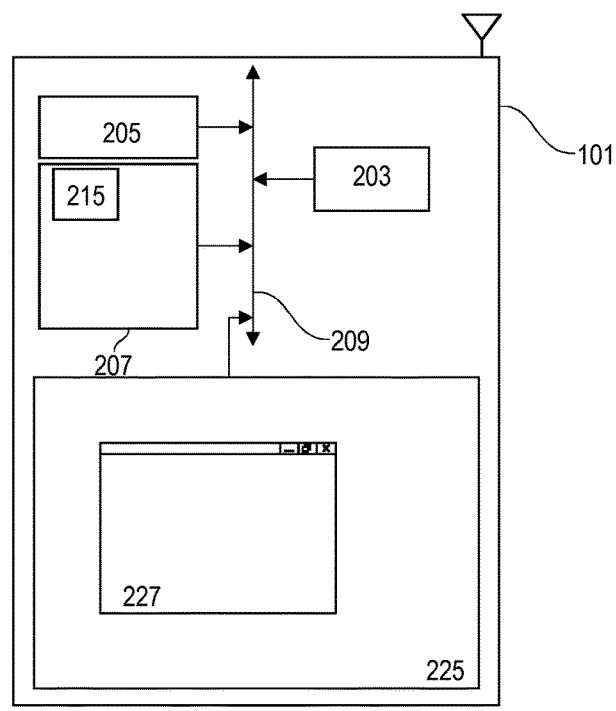
FIG. 2 shows an exemplary structure of a client terminal.

FIG. 2 shows an exemplary structure of a client terminal 101 of the one or more client terminals 101A-N. The client terminal 101 may comprise a mobile telecommunication device. The mobile telecommunication device 101 may comprise a processor 203, a transceiver 205, a memory 207 each capable of communicating with one or more components of the mobile telecommunication device 101. For example, all components are coupled to a bidirectional system bus 209. The mobile telecommunication device 101 may be a battery powered device.

The processor 203 may be a microprocessor, a single core processor, a multicore processor or the like. The processor 203 may control the operation of the mobile telecommunication device 101. The transceiver 205 can be implemented as a transmitting and receiving component of the mobile telecommunication device 101.

The mobile telecommunication device 101 may further comprise a display device 225 which displays characters and images and the like. For example, the display device 225 may be a touch sensitive display screen.

Using the transceiver 205, the mobile telecommunication device 101 may exchange data with the telecommunication server 105 via one of the networks 103A-C.

Memory 207 is configured to store at least one application 215 that is executable on the processor 203. For example, the application 215 may comprise a web browser. When the application 215 is executed on the processor 203, the application 215 causes the processor 203 to display on the display device 225 a graphical user interface 227 e.g. a web browser interface. Memory 207 may further temporarily store data entered by user 107 in the mobile telecommunication device 101 in offline mode (when the mobile telecommunication device is not connected to any network 103A-D).

For example, the mobile telecommunication device 101 may be operable to receive a request or input data from a user e.g. 107 via the graphical user interface 227 in order to request data of an electronic document from the telecommunication server 105. In response to the receiving of the request, the mobile telecommunication device 101 may send a request e.g. HTTP request to the telecommunication server 105 for requesting the data of the electronic document. The request may be performed in accordance with at least one API defined in the telecommunication server 105. The request may comprise an (unique) identification address of said electronic document.

The identification address may be defined or generated in accordance with a communication protocol of the network 103A-D that is used by the mobile telecommunication device 101 to send the request to the telecommunication server 105. For example, the identification address may comprise an IP address, media access control (MAC) address, a URL, a database entry, an Ethernet address etc.

Figure 3:
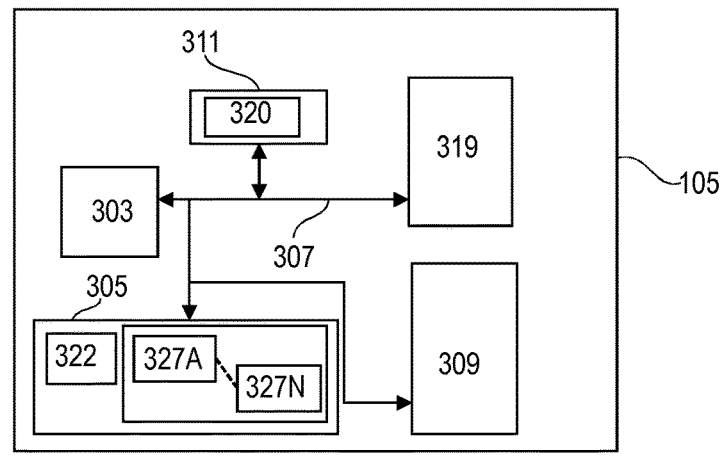
FIG. 3 shows an exemplary architecture of telecommunication server.

FIG. 3 depicts an exemplary architecture of telecommunication server 105. The telecommunication server 105 may be a computer system. The components of telecommunication server 301 may include, but are not limited to, one or more processors or processing units 303, a storage system 311, a memory system 305, and a bus 307 that couples various system components including memory system 305 to processor 303. Memory system 305 may include computer system readable media in the form of volatile memory, such as random access memory (RAM) and/or cache memory.

Telecommunication server 105 typically includes a variety of computer system readable media. Such media may be any available media that is accessible by telecommunication server 101, and it includes both volatile and non-volatile media, removable and non-removable media.

Telecommunication server 105 may also communicate with one or more external devices such as a keyboard, a pointing device, a display, etc.; one or more devices that enable a user to interact with telecommunication server 105; and/or any devices (e.g., network card, modem, etc.) that enable telecommunication server 105 to communicate with one or more other computing devices. Such communication can occur via I/O interface(s) 319. Still yet, telecommunication server 105 may communicate with one or more networks (103A-C) such as a local area network (LAN), a general wide area network (WAN), and/or a public network (e.g., the Internet) via network adapter 309 that may comprise a Wireless and/or mobile network adapter. As depicted, network adapter 309 communicates with the other components of telecommunication server 105 via bus 307.

Memory system 305 is configured to store a plurality of applications 327A-N that are executable on the processor 303. For example, the memory system 305 may comprise an operating system as well as application programs. Memory system 305 (or storage system 311) may further store an electronic document 322. Application 327A of the plurality of applications may be adapted to access or control access or provide access to the electronic document 322.

The term "electronic document" (or initial draft document or edit draft copy) as used herein refers to electronic data for use and/or to be entered in an electronic form that represents the electronic document. The electronic form may or may not be part of the electronic document. The electronic form may comprise, for example, a web form or HTML form that may be displayed a web page for enabling a user to enter at least part of the electronic data that is received by a server e.g. the telecommunication server for processing. The input fields may comprise checkboxes, radio buttons, or text fields that may be fill out by a user. For example, the electronic form when displayed on the client terminal 101A-N may be used to enter data to configure an engine or a machine connected and/or controlled by the telecommunication server.

When initially stored in memory 305, the electronic document 322 may comprise only the electronic form that represents the electronic document 322, as the electronic data may be subsequently received from a user of the electronic document 322 e.g. by entering data in input fields of the electronic form. For example, memory 305 stores the electronic document 322 means that the electronic form that represents the electronic document as well as the electronic data are stored in the memory 305. In another example, the electronic form may be stored in the memory 305 while the electronic data may be stored in a database 320 of the telecommunication server 105. In a further example, the storage of the electronic document 322 comprises storing the electronic data only.

For example, the telecommunication server 105 may comprise a web server. The web server may accept HTTP requests from client terminal 101A-N e.g. to access the electronic document, and provide them with the HTTP responses together with electronic data of the electronic document, which are usually web pages or web forms. For example, the electronic data is transferred separate from the electronic form e.g. web pages by distinct HTTP request/response pairs. In another example, the electronic data and the electronic form are sent together in a response.

The electronic document 322 may be represented by an entity graph that comprises a hierarchical tree structure of multiple entities, with a root entity and subtrees of children, represented as a set of linked entities (or nodes). Each entity of the multiple entities may correspond to one or more input fields of the electronic document. The hierarchical structure may, for example, depend on the time at which a given input field of the electronic document is to be filled. For example, if a first input field has to be filled before a second input field, then the entity of the second input field may be classified as children of the entity of the first input field. In another example, the hierarchical tree structure may be defined and received from a user of the electronic document.

The root entity may, for example, define the service that is associated with the electronic document 322 e.g. data control service.

The electronic document 322 may be assigned or used for a given service such as a data control service for controlling the function of a given engine by the telecommunication server, or a telecommunication service for recording user data on the telecommunication server 105. As soon as requested, an instance of the electronic document 322 may be assigned, by application 327A, to the requester of the electronic document 322.

For example, the electronic document 322 (or the instance of the electronic document) may be accessed by a client terminal 101A-N via a network 103B of the one or more networks e.g. using an identification address as described above with reference to FIG. 2. This network 103B may for example be a public network such as internet.

The telecommunication server 105 may further store e.g. using application 327A a status parameter in association with the electronic document 322. The status parameter may have a first, second or third value. The first value indicates a first state of the electronic document 322 in which the electronic document is not filled (e.g. no data of the electronic document). The second value indicates a second state of the electronic document 322 in which the electronic document 322 is completely filled. The third value indicates a third state of the electronic document 322 in which the electronic document 322 is being requested for modifying at least part of the data filled in the electronic document 322.

For example, the status parameter may be defined as an indicator or variable e.g. called EditState. EditState may have the following values.

Electronic Document is not filled: EditState=0 (first value); which corresponds to an initial draft document (as described below)

Electronic Document is completely filled: EditState=1 (second value)

Electronic Document being edited or requested for changing its content: EditState=1 (third value); which corresponds to an edit draft copy (as described below).

Figure 4:
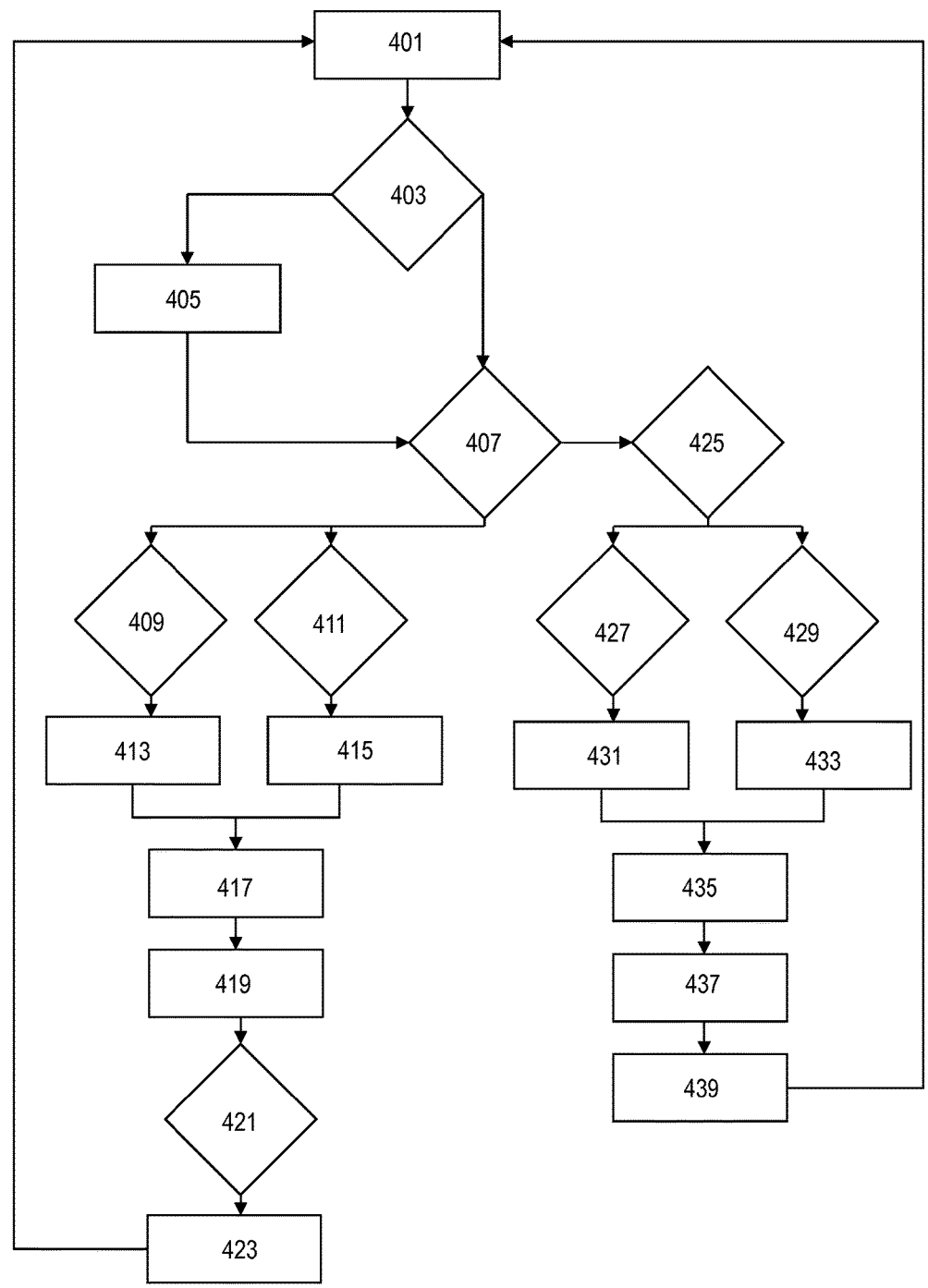
FIG. 4 is a flowchart of a method for controlling data access to the telecommunication server.

FIG. 4 is flowchart of a method for controlling data access to the telecommunication server e.g. 105.

In step 401, the telecommunication server 105 may receive a request from the client terminal 101A to access the electronic document 322.

For example, a user 107 may request a service that is provided by the telecommunication server 105 such as the data control service that is associated with the electronic document 322. The request may be performed in accordance with a communication protocol that is supported by e.g. network 103B that is used to access the electronic document 322. For example, the request may be a HTTP request generated via a web browser of the client terminal 101A (e.g. the user may use a HTTP link for requesting, indirectly, the electronic document 322). The request may be generated or created at the client terminal 101A using, for example, HTTP methods such as GET, POST, PUT, PATCH, and DELETE. Such HTTP methods may be used as REST service communications by the OData protocol. In another example, the request may be generated using WebSockets and/or generated in accordance with an intranet protocol such as RFC for OData protocol.

In step 403, the telecommunication server 105 may determine if the received request is a first request to access the electronic document 322 or not. If the received request is a first request for accessing the electronic document 322 the telecommunication server 105 may set (e.g. using application 327A), in step 405, the status parameter to the first value.

For example, an instance of the electronic document may optionally be created and tagged as being assigned to the user 107 who requested the electronic document 322 (in the following the electronic document 322 is also referred to as the instance of the electronic document 322). For example, the electronic document 322 may be assigned to the user 107 taking into account user settings of the user 107, such as, the language used by the user 107 such that the electronic form of or that represents the electronic document 322 may contain information in the language of the first user 107. In another example, the electronic form 322 may be adapted to contain more or less input fields dependent on the location of the user 107. If, for example, the user 107 is located in Europe, a field concerning the country ID or name may not be added to the electronic form. In another example, the electronic document 322 may be usable or used by any of the users 107 (e.g. no need of an instantiation of the electronic document 322).

In step 407, the telecommunication server 105 may determine whether the status parameter has the first value or not. If the status parameter has the first value, steps 409-423 may be performed, otherwise steps 425-439 may be performed.

The telecommunication server 105 may determine in step 409 whether an initial draft document that comprises content of the electronic document 322 is previously created or not. In step 413, the telecommunication server 105 may create the initial draft document having at least the content the electronic document 322 if the initial draft document is not created. The initial draft document may for example be an empty copy of the electronic document 322 i.e. has no data filled in the fields of the electronic document 322 e.g. no electronic data. In another example, the initial draft document may have additional default data that is usually filled in some default fields of electronic documents such as electronic document 322.

In step 411, the telecommunication server 105 may determine whether an identification address is assigned to the initial draft document or not such that a client terminal 101A-N may access the initial draft document using the identification address. In step 415, the telecommunication server 105 may assign a first identification address to the initial draft document for accessing the initial draft document if the first identification address is not assigned to the initial draft document (or if the initial draft document is not assigned an identification address e.g. in accordance with the present method). The first identification address may be generated in accordance with a communication protocol of a network 103C that is different from the network 103B that is used to request or access the electronic document 322. In another example, the first identification address may be generated in accordance with a communication protocol of network 103B that is the same as the one used to request the electronic document 322.

In step 417, at least the client terminal 101A may display the initial draft document (e.g. the client terminal 101A may display the electronic form of the initial draft document and electronic data in fields of the electronic form that have been e.g. previously filled) on the client terminal 101A. For example, the client terminal 101A may receive a response to the request from the telecommunication server 105. The response may comprise the initial draft document and/or an indication of the first identification address (e.g. for a subsequent use). The initial draft document may be displayed on the graphical user interface 227 of the client terminal 101A e.g. with an indication of the first identification address.

For example, other client terminals e.g. 101B and 101C may display the initial draft document such that entries of data may be filled and received at the telecommunication server 105 concurrently from the client terminals 101A-C. For example, the initial draft document may be split into portions corresponding to respective client terminals 101A-C, wherein each portion of the initial draft document may be editable on the corresponding client terminal 101A-C and may be read only on the other non-corresponding client terminals.

The client terminal 101A may receive user data e.g. as entries into input fields of the initial draft document, and may send the user data to the telecommunication server 105. The user data may be received during one or more login sessions to the client terminal 101A. That is, a user of client terminal 101A may login for a first time period, enter a portion of data in the initial draft document and log-out, then login again for a second time period enter another portion of data and so forth. The one or more logins sessions may belong to one or more communication sessions between the client terminal 101A and the telecommunication server 105.

In step 419, the telecommunication server 105 may receive from the client terminal 101A user data, and may save the received user data in the initial draft document that is stored in the telecommunication server 105. This step 419 may be repeated as soon as user data are received or entered by the user in the initial draft document at the client terminal 101A. For example, the client terminal 101A may be configured to send the user data in a regular time interval e.g. every minute the client terminal may check if new user data are entered may then send them to the telecommunication server 105.

In step 421, the telecommunication server 105 may determine whether all data required to completely fill the initial draft document is received or not. For example, in order to be complete, it may be required that the initial draft document may comprise a given set of user data e.g. that fills all or part of the input fields of the initial draft document. For example, the telecommunication server 105 may check that the whole set of user data is in the initial draft document (e.g. that all the input fields or the part of input fields are filled). In addition, the telecommunication server 105 may optionally check for consistency between data of different fields of the initial draft document.

If the set of user data is completely received in that it is saved in the initial draft document (and optionally an activation has been requested by the client terminal 101A or by each of the client terminals 101A-C that jointly share different portions of the initial draft document), the telecommunication server 105 may, in step 423, set the status parameter to the second value, copy the initial draft document into the electronic document 322, assign a second identification address to the electronic document 322 for access via a network e.g. 103B to the electronic document 322, and delete the initial draft document. The second identification address may be different from the first identification address in that it may be generated in accordance with a communication protocol of the network 103B that is different from the network associated with the first identification address. In another example, the second identification address may be the same as the first identification address. The telecommunication server 105 may for example sends a message to the client terminal indicating the second identification address and that the initial draft document is completed. In another example, the client terminal 101A may determine automatically whether the initial draft document is completed.

In step 425, the telecommunication server 105 may determine if the status parameter has the second value or the third value or not. If the status parameter has the second value or the third value steps 427-439 may be performed. The status parameter having the second value means that the received request in step 401 is for modifying or updating the existing content of the electronic document 322. In this case, the request indicates the second identification address and/or first identification address. In case, the first identification address is indicated, the request may be redirected to the second identification address since the initial draft document is deleted.

The telecommunication server 105 may determine in step 427 whether an edit draft copy of the electronic document 322 is previously created or not. In step 431, the telecommunication server 105 may create the edit draft copy of the electronic document 322 if the edit draft copy is not created.

In step 429, the telecommunication server 105 may determine whether an identification address is assigned to the edit draft copy or not. In step 433, the telecommunication server may assign a third identification address to the edit draft copy for accessing the edit draft copy if the third identification address is not assigned to the edit draft copy (or if the edit draft copy is not assigned an identification address e.g. in accordance with the present method), and may set the status parameter to the third value if the status parameter has the second value. The third identification address may be generated in accordance with a communication protocol of a network 103A that is different from the networks 103B and 103C that are used to request or access the electronic document 322 and the initial draft document. In another example, the third identification address may be generated in accordance with a communication protocol of network 103B that is the same as the one used to request the electronic document 322. In another example, the third identification address may be generated in accordance with a communication protocol of network 103C that is the same as the one used to request the initial draft document.

In step 435, at least the client terminal 101A may display the edit draft copy on the client terminal 101A. For example, the client terminal 101A may receive a response to the request from the telecommunication server 105. The response may comprise the edit draft copy and/or an indication of the third identification address (e.g. for a subsequent use). The edit draft copy may be displayed on the graphical user interface 227 of the client terminal 101A e.g. with an indication of the third identification address.

The client terminal 101A may receive modifications to the set of user data e.g. in input fields of the edit draft copy, and may send the modifications to the telecommunication server 105. The modifications may be received during one or more login sessions to the client terminal 101A. That is, a user of client terminal 101A may login for a first time period, enter first modifications in the edit draft copy and log-out, then login again for a second time period enter other modifications and so forth. The one or more logins sessions may belong to one or more communication sessions between the client terminal 101A and the telecommunication server 105.

In step 437, the telecommunication server 105 may receive the modifications to the set of user data from the client terminal 101A, and modify the edit draft document using the received modifications. This step 437 may be repeated as soon as modifications are received or entered by the user in the edit draft copy at the client terminal 101A. For example, the client terminal 101A may be configured to send the modifications in a regular time interval e.g. every minute, the client terminal 101A may check if new modifications are entered may then send them to the telecommunication server 105.

In step 439, and in response to receiving a save or an activate modification request from the client terminal 101A, the telecommunication server 105 may set the status parameter to the second value, copy the edit draft copy into the electronic document 322 and delete the edit draft copy.

For example, an application 327E of the plurality of applications 327A-N may be used by the telecommunication server 105 to access or control access or provide access to the initial draft document and the edit draft copy.

Steps 401 to 439 may be repeated in one or more consecutive communication sessions between the client terminal 101A and the telecommunication server 105 using at least one of the first, second and third identification addresses. For example, the client terminal 101A may establish a first communication session with the telecommunication server 105 and steps 401-439 may be performed, and the first communication session may be closed. After that, the user may establish a second communication session with the telecommunication server 105 and steps 401-439 may be performed again and so forth. For example, within a same session e.g. the first communication session the user may have one or more login sessions into the client terminal 101A. For example, for the request of step 401, the user may use one of the identification addresses that are available at the client terminal 101A, if a document (e.g. edit draft copy) to which the identification address is assigned is not existing the request may be redirected using an address of the electronic document 322 or the one of the initial or edit draft copy if it exists.

A communication session refers to information interchange between the client terminal and the telecommunication server, with the information interchange having a defined start and end. The start may be defined for example by a request for authentication with the telecommunication server. For example, the request from the client terminal 101A to access the electronic document 322 of step 401 may be used for authentication with the telecommunication server. A series of requests to the telecommunication server 105 originating from the same user e.g. at the same browser may be part of the same communication session. The end may be defined by e.g. closing a browser used to perform the request.

FIG. 5 depicts an exemplary telecommunication system 500 in accordance with the present disclosure. The exemplary telecommunication system 500 may support OData communication protocol. Components of the telecommunication system 500 comprise a client terminal 501 (such as 101) a gateway 503 and a draft logic 535 e.g. such as the telecommunication server 105. The gateway 503 may or may not be part of the draft logic 535.

The client terminal 501 may comprise a user interface (e.g. of applications in S/4HANA) that may be generated by an application of the client terminal 501. The user interface may be browser based and available in a responsive design on multiple devices. The browser may enable access to multiple applications (513, 515) which are managed by a shell 509. Within the browser 507, shell 509, the Fiori Launchpad, is run to start the application and enable cross-application services like search, navigation, application favorites and document bookmarks, notifications and tasks, or user profile related functions. The role-based shell content is based on application catalogs of the multiple applications whose entries are associated with user roles that refer to required authorizations in the draft logic 535. For certain mobile devices, a player 511—like the Fiori Client—is provided which encapsulates the browser's behavior in order to e.g. optimize the cache strategy in mobile networks or to enable native device capabilities.

The application may be developed based on the Fiori UX paradigm using SAP UI5 programming model.

Beyond application specific UI artifacts, the client terminal 501 may enable reuse for efficient and consistent development using component 517. Reuse can be differentiated in simple and complex cases. For the simple reuse case, development artifacts are contained in reuse library, referenced from it and instantiated within the application. In contrast, complex reuse establishes autonomous components that potentially interact with their own OData service.

For any of these artifacts it is beneficial to exploit information anyway consistently defined in the backend e.g. in Core Data Services (CDS), the global term catalog or the data dictionary. Thus, such information and content has to be transferred with the backend service as annotations or special entities. UI5 controls generically render and behave with respect to annotated service metadata and data to introduce e.g. translated UI texts, value helps or field control. The communication over HTTP(s)/Web Socket is stateless following REST paradigms by focusing on the OData protocol as described in more details below.

The gateway 503 enables a decoupled access to the backend server's 505 logic and data, shell content and layered UI configurations, or application metadata. The gateway 503 targets at harmonized access by introducing most—if not all—of the communication using the OData protocol in a stateless, REST based manner. OData services are exposed on a web tier either using HTTPS short-term as technical protocol or considering WebSockets as a mid-term option for highly interactive and collaborative scenarios.

The gateway 503 comprises a controller 519 that relates to OData services implemented by model and data providers. For Fiori applications and its data, service model 521 is typically tailored to a certain application design. However, it may be reused in a family of similar applications or for application variants that e.g. address different device channels. The model is a projection of the underlying electronic document (the actual data) persistence or the temporary data in the draft persistence.

However, the data persistence is not directly mapped to service model 521. It is first modeled in CDS interface views in particular basic views of normalized core or draft entities. These CDS views are the source for creating SADL based OData Services supporting a de-normalized projection to OData entities. The SADL based OData service is used for complex transactions to access data by SQL derived from the views in pure read-only scenarios. In transactional/write scenarios the service calls draft infrastructure 525 of the draft logic 535 to accomplish intermediate draft documents or copies and thereby stateless interactions. In addition, it is possible to directly call the underlying application logic (e.g. 327A) e.g. for simple task enabling applications.

A separate set of UI configuration controllers 523 of the gateway 503 control access to metadata like layered UI configurations and personalization, application catalogs and descriptions (BOM/bill of material), or semantic objects and navigation targets.

The draft logic 535 may comprise an application logic 527 (such as application 327A). An implementation of the application logic 527 may exist based on a stateful programming model. While calling this stateful logic directly used for single requests in task enabling application, but not for the series of requests required in complex transactions. Instead a stateless processing of a draft document is introduced. However, even the draft may incorporate parts of the application logic e.g. for incremental creation of documents or in general for an acceptable usability for end-users editing a draft.

The application logic 527 is emphasized as Stateless Enablement which refers to application coding disassembled from the stateful chunk to be called in small units from the draft infrastructure 525. The stateless enablement targets at extracting side effect free functionality for validations 529 and preparations 531. Preparations 531 are meant to initialize draft entity data in the course of gradually entering data in the application UI. The purpose of validations 529 is to increase the user comfort and return warning messages specific to already entered data.

With this approach, a stateless enablement as the interface with the draft document or copy can be accomplished in an evolutionary approach adding more preparations and validations over time. Though preparations that are mandatory for the interaction flow and gradual document creation must be tackled with highest priority, there is still a chance to mitigate their transition by using the soft state.

The third important function in the relation between draft and application logic is the activation logic 533. The activation logic 533 may be a broad API that receives and processes a finalized draft document or copy at once. The draft copy or document is activated to become an (active) electronic document (e.g. copying the content of the draft copy into the electronic document) in the actual data persistence and deleted thereafter.

In traditional data entry applications, the life time of a modified electronic document is tied to a session lifecycle which also controls pessimistic locks and reservations.

With the present exemplary method draft documents are stored in the database. Where required the draft document receives the logical ownership of pessimistic locks and reservations. The draft copies enable stateless interactions.

The draft state is an integral part of the electronic document's life cycle. The draft infrastructure 525 allows to add an "initial draft document" as well as an "edit draft copy" state to existing electronic documents. At its core draft logic 535 (such as draft application 327E) provides the OData functions derived from a draft state model. The draft logic 535 stores the initial draft document or edit draft copy with each modifying request in order to enable the above formulated stateless communication paradigm. The draft logic 535 and its core choreography shall be generated in a consistent way. It establishes the handling of transactions and lock contexts as well as offers callbacks to the stateless enabled application logic for validations and preparations as well as the application logic upon draft activation. The draft logic 535 may use a Business Object Processing Framework (BOPF) introducing an observer pattern to react to user entries with specific preparations and validations.

Since drafts (initial draft document and edit draft copy) and locks of the drafts are decoupled from the Advanced Business Application Programming (ABAP) (communication) session (in that the drafts and locks are independent of whether the communication session is ended or not) and memory the draft infrastructure 525 may comprise lifecycle services 537 that handle expirations and notification events. Upon expiration the associated drafts or locks are removed.

The draft model shall be generated with respect to normalized core entity views. Modeling the draft close to the application not only enables various projections for application UIs and eases the activation logic and interface. Such a draft can also be used in extended scenarios like forward error handling, staging of master data, import of data from external formats, or offline support.

The backend server 505 may further comprise an interface 539 for accessing drafts (initial draft document and/or edit draft copy) persisted or stored in database 541 and for accessing electronic documents persisted or stored in database 543.

Figure 6:
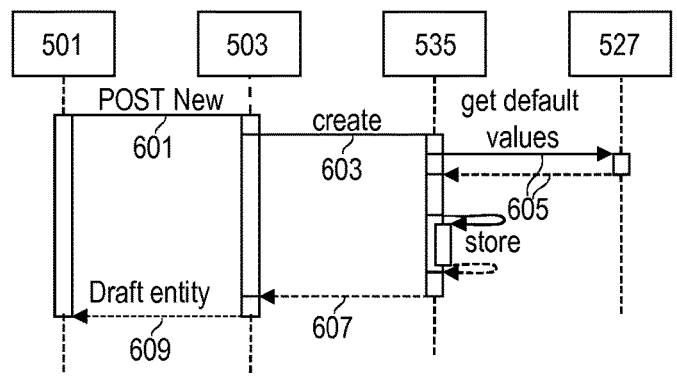
FIG. 6 shows a flow diagram of an exemplary method for creating an initial draft document.

FIG. 6 shows a flow diagram of an exemplary method for creating an initial draft document. Upon receiving a POST request 601 at the gateway 503 from the client terminal 501, the gateway 503 may forward a creation request 603 to the draft logic 535. The POST request may be an indication of a first request for accessing an electronic document such as electronic document 322. For example, the electronic document may have a hierarchical tree structure with a single root entity and the POST request is on the entity set for the root entities. The root entity set is identified in property RootEntitySet of the annotation Common.DraftEnabled on the entity container. An entity set may be built from entities of the one or more entity graphs (e.g. the entity set may comprise an entity of each of the one or more entity graphs that per-form the same task).

Additionally, it can be created based on another referenced electronic document (of the same or a different type as the electronic document 322) by calling the action identified in property NewAction of the annotation Common.DraftEnabled on the entity container.

The initial draft document may be empty, or may be pre-filled with default values derived from system preferences, user preferences, or from related documents (e.g. create an order for a product selected from a catalog).

The draft logic 535 (e.g. draft application 327E) may request 605 from the application logic 527 (such as application 327A) default values that exist for defining the initial draft document and receive default values. Using the defaults values the draft logic 535 may create the initial draft document comprising the content of the electronic document prefilled with the default values, and may send a response to the gateway 503 indicating that the initial draft document is created and stored for subsequent stateless operations.

The gateway 503 responds to the client terminal 501 with 200 OK 609 and the new after-image (which is an entity graph of the initial draft document or the initial draft document with updated data) that may contain default values, calculated values, or field-control information; the client can specify the desired expansion level via $expand.

Figure 7:
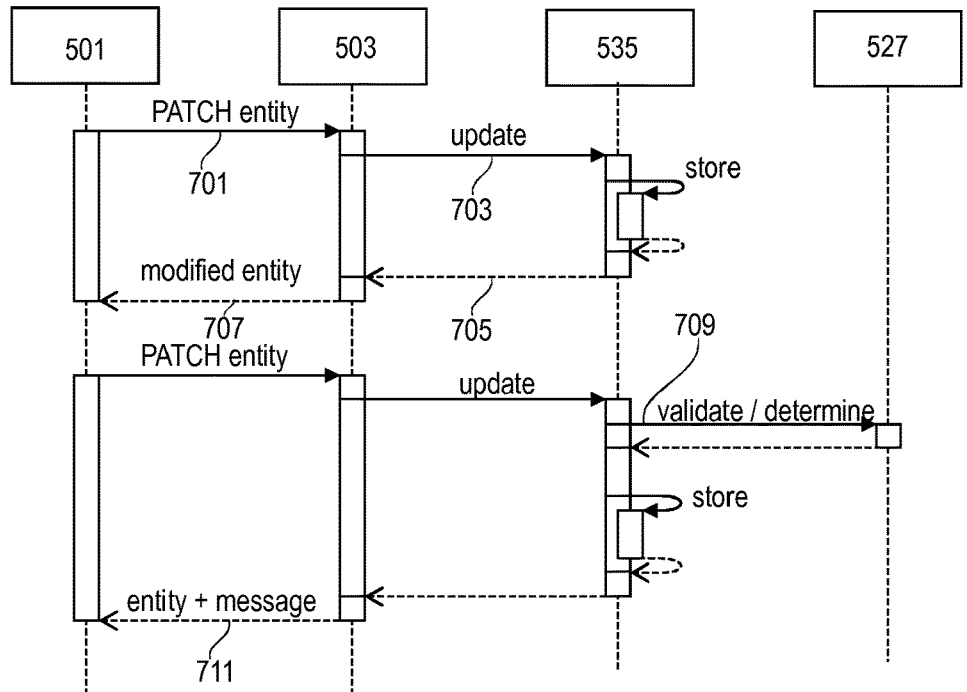
FIG. 7 is a flow diagram of a method for transmitting user data input at the client terminal.

FIG. 7 is a flow diagram of a method for transmitting user data that is input in (that modify) the initial draft document or the edit draft copy at the client terminal 501. User input is transported 701-703 to the draft logic 535 via the gateway 503 using PATCH requests. This can result in warning messages 705 (e.g. transported via the response header SAP-Message), and recalculation of properties, including field-control properties from the draft logic 535. If the gateway 503 is using OData 4.0 then the gateway 503 may respond with 200 OK 707 and the new after-image (such that no need for a separate request to bring the updated entity graph and/or drafts to the client terminal 501). However, if the gateway 503 is using OData 2.0, the gateway 503 may respond with 204 No Content in a non-error case. The client terminal 501 may send a subsequent GET request in order to request recalculated properties (bundling the PATCH and GET requests in a batch request may be used).

Steps 701-703 may be repeated for example to check or validate the data entered in the initial draft document or edit draft copy and transmitted with steps 701-707. In addition, a validation 709 may be performed between the draft logic 535 and the application logic 527. And a response 711 e.g. 200 OK may be sent as response to the client terminal 501 indicative of the result of the validation.

Figure 8:
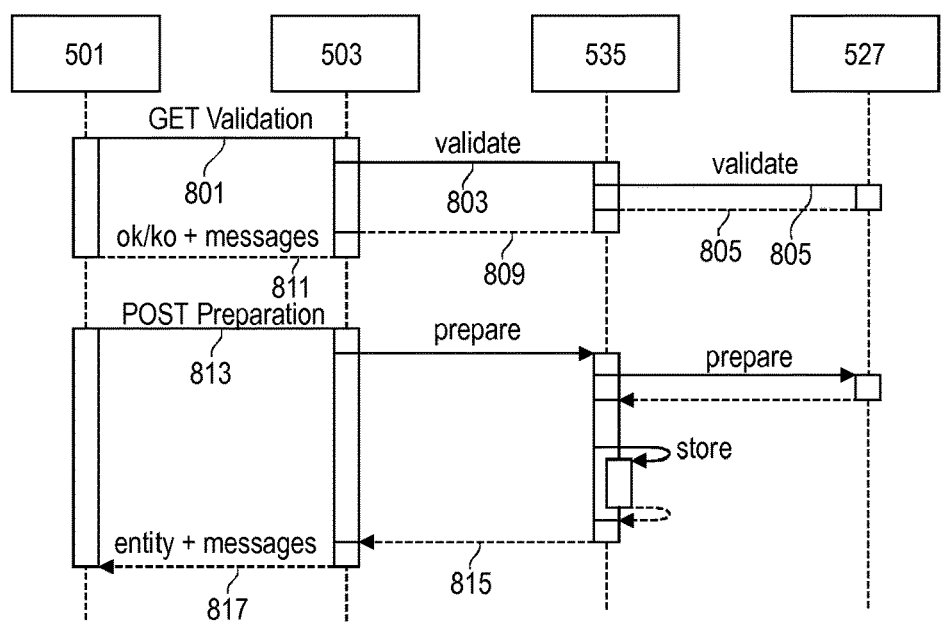
FIG. 8 is a flow diagram of a method for validating the initial draft document or the edit draft copy for consistency.

FIG. 8 is a flow diagram of a method for validating the initial draft document for consistency. The initial draft document or edit draft copy may be validated for consistency at any time by calling by the client terminal 501 a Validate function on the root entity of the initial draft document or edit draft copy that triggers validation request 801-805 to be submitted to the draft logic 535 via the gateway 503 and to the application logic 527 via the draft logic 535. This will return a list of messages 809-811, each with a reference to the problematic part of the draft. A problematic part may for example be a field of the initial draft document or edit draft copy that is configured to receive numbers contains string characters etc.

The initial draft document or edit draft copy may be enriched at any time by calling a Prepare action 813 on the root entity of the initial draft document or edit draft copy. The Prepare action may have side-effects and modify the initial draft document or edit draft copy. In addition it may return messages 815-817 as a result of consistency checks or other processing logic triggered by it.

Figure 9:
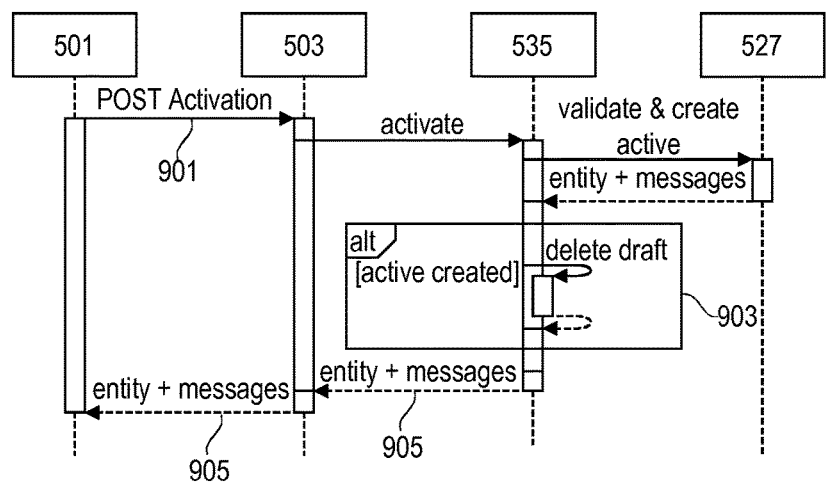
FIG. 9 is a flow diagram of a method for converting the initial draft document or the edit draft copy into the electronic document.

FIG. 9 is a flow diagram of a method for converting the initial draft document or edit draft copy into the electronic document 322 by copying the data filled in the initial draft document or edit draft copy into the electronic document 322. The initial draft document or edit draft copy may be converted into the electronic document 322 by invoking the Activate action 901 on the root entity of the initial draft document or edit draft copy. This will implicitly trigger the functionality behind the Validate function (or a stronger check routine) and may implicitly trigger parts or all of the functionality behind the Prepare action. It also needs to update foreign key values in case final semantic keys are determined when activating draft entities. Also the initial draft document or edit draft copy is deleted after copying 903 its data into the electronic document 322. The conversion and deletion 903 may be an atomic operation.

Figure 10:
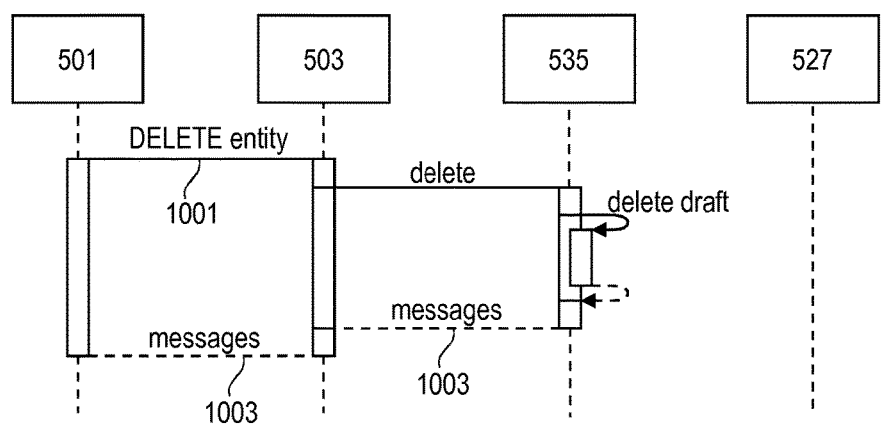
FIG. 10 is a flow diagram of a method for canceling data previously entered into the initial draft document or the edit draft copy.

FIG. 10 is a flow diagram of a method for canceling data previously entered into (or deleting) the initial draft document or edit draft copy. The initial draft document or edit draft copy may be deleted with a DELETE request 1001 (to the draft logic 535 via the gateway 503) to the root entity of the initial draft document or edit draft copy; the root entity and all dependent entities will be deleted. This may be explicitly made visible with an "on delete cascade" constraint in the OData model. In addition all locks and reservations bound to the initial draft document or edit draft copy will be deleted.

Figure 11:
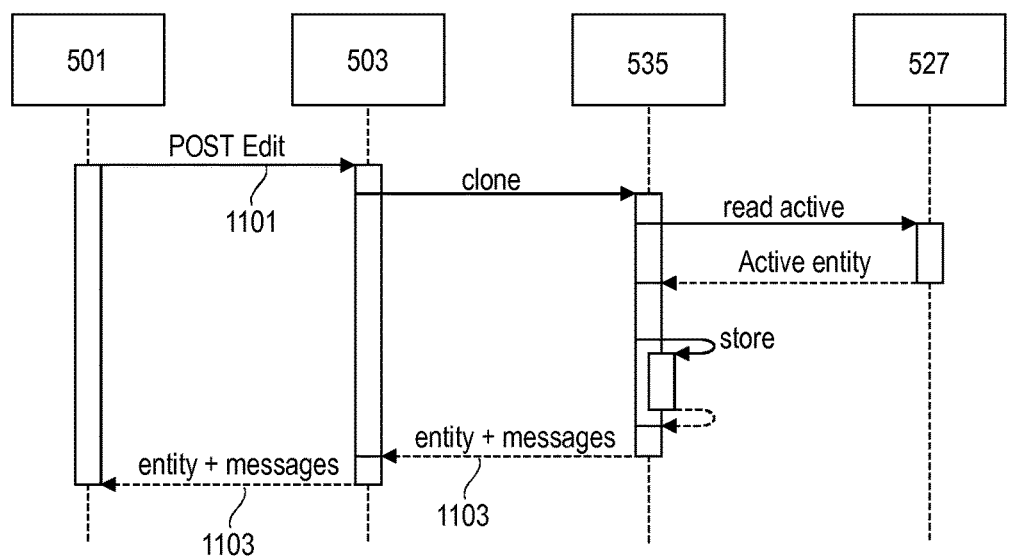
FIG. 11 is a flow diagram of a method for creating an edit draft copy.

FIG. 11 is a flow diagram of a method for creating an edit draft copy. When an existing electronic document (completely filled) is requested for edition, an edit draft copy is created by invoking the Edit action 1101 (at the client terminal 501) on the root entity of the electronic document 322. This creates a deep copy of the electronic document 322. The edit draft copy resides in the same entity sets as the electronic document 322. If an electronic document already has an edit draft copy, the Edit action fails; there can be at most one edit draft copy per electronic document (instance).

User input to the edit draft copy is transported to the draft logic 535 via PATCH requests, similar to editing the initial draft document as already described above. PATCH requests can result in warning messages and recalculation of properties in the entity graph.

The edit draft copy may be validated at any time by calling the Validate function on the root entity of the edit draft copy. Other entities of the edit draft copy may offer localized overloads of the Validate function. The Validate function on an edit draft copy returns a list of warning messages for the draft entity graph. The Prepare action on an edit draft copy may create, change, or release locks or reservations bound to the edit draft. It may also create and initialize contained drafts. The edit draft copy may be converted into a new version of the electronic document 322 by invoking the Activate action on the root entity of the edit draft copy. If the user cancels data modification and no one else works on the same edit draft copy, the edit draft copy may be deleted with a DELETE request to the root entity of the edit draft copy together with all bound reservations and locks.

All requests described above with reference to FIG. 6-11 may return error, warning, and success messages in the response header SAP-Message e.g. 607-609, 705-707, 905, 1003, 1103 messages.

In the following is an example method to adapt the OData model (referred hereinafter as original ore draft-less OData model) to the present method to provide a new OData model (referred to as draft enabled OData model). The present method as described above involves drafts such as the initial draft document and the edit draft copy in order to fill data in an electronic document e.g. 322.

As described above, the at least one telecommunication server 105 may support or provide services, wherein each service may be associated with at least one electronic document and associated entity graph. This may result in one or more entity graphs. An entity set may be built from entities of the one or more entity graphs (e.g. the entity set may comprise an entity of each of the one or more entity graphs that perform the same task). For example, an entity set may be marked as a draft rootset that contains root entities of the one or more entity graphs.

A draft scope may be defined for the new OData model. The draft scope consists of all entity sets that allow editing in the context of this service (e.g. it involves all electronic documents that are associated with that service e.g. the data control service), i.e. it is the maximum structure of initial draft document or edit draft copies for this service. Entity sets outside of the draft scope are "read-only"; their entities can only be referenced by draft entities, e.g. referenced master data or value lists.

At least one entity set of the draft scope must be marked as a draft rootset, that contains root entities of active or draft copies (active document refers to an electronic document such as 322). The Edit and Activate actions are only available on the root entities.

The entity types of all entity sets outside of the draft scope are identical in the original OData model and in the draft-enabled OData model. All other entity types are transformed (from the original OData model to the new OData model) by adding a key property ID of type EDM.String to the entity type. All key properties of a draft-less entity type (i.e. entity type of the original OData model) are part of the draft-enabled entity type (i.e. entity type of the new OData model) as non-key properties, and they are tagged with the term SemanticKey. All non-key properties and navigation properties of a draft-less entity type are part of the draft-enabled entity type without any change. As a next step the property EditState may be added and the navigation property TwinEntity (in rare cases this navigation property could be omitted for non-root entities if the correlation between active entity (of the active document) and draft entity (of the initial or edit draft copy) cannot be established). Finally a user entity type and following additional administrative data at least on the draft-enabled root entity type are added:

CreatedBy (Navigation to User),
CreatedAt (Edm.DateTimeOffset),
LastChangedBy (Navigation to User)—when presenting drafts in lists
LastChangedAt (Edm.DateTimeOff set)—when presenting drafts in "recovery mode",
ExclusiveFor (Navigation to user)—current exclusive editor
ExclusiveSince (Edm.DateTimeOffset)—exclusively edited since The User entity type has at least the properties:
FullName (Edm.String)
PhotoURL (Edm.String)
JobTitle (Edm.String)
EmailAddress (Edm.String)
WorkPhone (Edm.String)
MobilePhone (Edm.String)
WorkAddress (Edm.String)

To avoid relying on naming conventions and be open for future extensions it is annotated with the term Communication.Contact.

The following table describes correspondence between the original OData model (OData v2) and the new (adapted to the present method) OData model (OData v4).

| Logical Action | OData V2 Operation | Example | OData V4 Operation | Example |
|---|---|---|---|---|
| New | POST request to root entity set | POST ~/Orders | Additionally New action bound to root entity set | POST ~/Orders/New |
| Modify | PATCH requests to existing draft entities POST requests to create dependent draft entities DELETE requests to delete dependent draft entities | | Identical to V2 | |
| Cancel | DELETE request to root draft entity | DELETE ~/Orders(4711) | DELETE request to root draft entity | DELETE ~/Orders(4711) |

-continued

| Logical Action | OData V2 Operation | Example | OData V4 Operation | Example |
| --- | --- | --- | --- | --- |
| Validate | Function import taking key parameters of root entity type. Optional: function imports for non-root entity types | GET ~/OrderValidation?ID=4711 | Function bound to root entity type. Optional: functions bound to non-root entity types | GET ~/Orders(4711)/Validation( ) |
| Prepare | Function import taking key parameters of root entity type. Optional: function imports for non-root entity types | POST ~/OrderPreparation?ID=4711 | Action bound to root entity type. Optional: actions bound to non-root entity types | POST ~/Orders(4711)/Preparation |
| Activate | Function import taking key parameters of root entity type | POST ~/OrderActivation?ID=4711 | Action bound to root entity type | POST ~/Orders(4711)/Activation |
| Edit | Function import taking key parameters of root entity type | POST ~/OrdersEdit?ID=4711 | Action bound to root entity type | POST ~/Orders(4711)/Edit |

The following are example signatures for OData 4.0

```
<ComplexType Name="ValidationResult">
    <Property Name="IsValid" Type="Edm.Boolean" />
</ComplexType>
<Action Name="Edit" IsBound="true">
    <Parameter Name="ActiveRoot" Type="Model.Order" />
    <ReturnType Type="Model.Order" />
</Action>
<Function Name="Validation" IsBound="true">
    <Parameter Name="DraftRoot" Type="Model.Order" />
    <ReturnType Type="Model.ValidationResult" />
</Function>
<Action Name="Preparation" IsBound="true">
    <Parameter Name="DraftRoot" Type="Model.Order" />
    <ReturnType Type="Model.Order" />
</Action>
<Action Name="Activation" IsBound="true">
    <Parameter Name="DraftRoot" Type="Model.Order" />
    <ReturnType Type="Model.Order" />
</Action>
```

The draft-enabled OData model may be be annotated so that generic client components can interact with the draft (initial draft document ore edit draft copy) without having to rely on out-of-band knowledge or naming conventions. OData 4.0 specifies how to define custom annotations, and this mechanism is used to describe SAP-specific annotations for draft document handling. The first annotation is for entity sets that contain root entities of draft-enabled documents:

```
<Term Name="DraftRoot" Type="Common.DraftRootType" AppliesTo="EntitySet">
    <Annotation Term="Core.Description">
        <String>Root entities of business documents that support the draft pattern</String>
    </Annotation>
</Term>
```

This is a structured annotation, listing at least the activation action that converts a draft into an active document (e.g. converting the edit draft copy to electronic document 322 as described above). All other actions are optional: preparation, validation, edit, and initial draft documents from existing electronic document:

```
<ComplexType Name="DraftRootType" BaseType="DraftNodeType">
    <Property Name="ActivationAction" Type="Common.QualifiedName" Nullable="false">
        <Annotation Term="Core.Documentation"
            String="Action that activates a draft document" />
    </Property>
    <Property Name="EditAction" Type="Common.QualifiedName">
        <Annotation Term="Core.Documentation"
            String="Action that creates an edit draft" />
    </Property>
    <Property Name="NewAction" Type="Common.QualifiedName">
        <Annotation Term="Core.Documentation"
            String="Action that creates a new draft. It may have overloads that
                allow referencing other business documents that are used to
                pre-fill the new draft" />
    </Property>
</ComplexType>
```

The second annotation is for entity sets that contain non-root nodes of draft-enabled documents:

```
<Term Name="DraftNode" Type="Common.DraftNodeType" AppliesTo="EntitySet">
    <Annotation Term="Core.Description">
        <String>Entities in this set are parts of business documents that support the
            draft pattern</String>
    </Annotation>
</Term>
```

This is a structured annotation, listing the node-specific preparation action and validation function:

```
<ComplexType Name="DraftNodeType">
    <Property Name="PreparationAction"
```

-continued

```
Type="Common.QualifiedName">
    <Annotation Term="Core.Documentation"
            String="Action that prepares a draft entity for
later activation" />
    </Property>
    <Property Name="ValidationFunction"
Type="Common.QualifiedName">
    <Annotation Term="Core.Documentation"
            String="Function that validates whether a draft
entity is ready for
                    activation" />
    </Property>
</ComplexType>
```

The third annotation is for entity sets whose draft entities will implicitly be activated together with draft entities in the referenced entity sets

```
<Term Name="DraftActivationVia"
Type="Collection(Common.SimpleIdentifier)"
    AppliesTo="EntitySet" Nullable="false">
    <Annotation Term="Core.Documentation"
        String="Draft entities in this set are indirectly
activated via draft entities
                in the referenced entity sets" />
</Term>
```

The fourth annotation lists all the properties of an entity type which form the key of the corresponding "draft-less" entity type

```
<Term Name="SemanticKey" AppliesTo="EntityType"
Type="Collection(Edm.PropertyPath)">
    <Annotation Term="Core.Description"
            String="The listed properties form the semantic
key, i.e. they are
                    unique modulo the EditState." />
</Term>
```

These annotations share two reuse types:

```
<TyspeDefinition Name="SimpleIdentifier"
UnderlyingType="Edm.String">
    <Annotation Term="Core.Description"
            String="The SimpleIdentifier of an OData construct
in scope" />
</TypeDefinition>
<TypeDefinition Name="QualifiedName"
UnderlyingType="Edm.String">
    <Annotation Term="Core.Description"
            String="The QualifiedName of an OData construct in
scope" />
</TypeDefinition>
```

LIST OF REFERENCE NUMBERS

100 telecommunication system
101A-N client terminal
103A-C network
103D link
105 telecommunication server
107 user
203 processor
205 transceiver
207 memory
209 bus
215 application
225 display device
227 graphical user interface
303 processor
305 memory
311 storage
309 network adapter
319 I/O interface
327 application program
401-439 steps
500 telecommunication system
501 client terminal
503 gateway
505 telecommunication server
507 browser
509 shell
511 player
513 application
515 application
517 reuse container component
519 controller
521 service model
523 UI configuration controller
525 draft infrastructure
527 application logic
529 validations
531 preparations
533 activation logic
535 draft logic
537 lifecycle services
539 interface
541 database
543 database.

The invention claimed is:

1. A telecommunication method for controlling data access to a telecommunication server, the telecommunication server connected to at least one client terminal via at least a first telecommunication network, the telecommunication server configured to communicate with the client terminal via a stateless protocol, the client terminal being a battery powered device, the method comprising:

a) providing, by the telecommunication server, an electronic document having a plurality of input fields for entry of a set of user data to the client terminal via the first telecommunication network;

b) storing, by the telecommunication server, a status parameter in association with the electronic document, the status parameter having one of a first value, a second value, or a third value, the first value indicating a first state of the electronic document in which the electronic document does not contain user data, the second value indicating a second state of the electronic document in which the electronic document is filled with the set of user data, the third value indicating a third state of the electronic document in which the electronic document is being requested for modifying at least part of the set of user data;

c) receiving, by the telecommunication server, a request from the client terminal to access the electronic document;

d) setting, by the telecommunication server, the status parameter to the first value in response to determining the received request is a first request to access the electronic document;

e) in response to determining that the status parameter has the first value,
    creating, by the telecommunication server, an initial draft document including content of the electronic document in response to determining the initial draft document has not been created, assigning, by the telecommunication server, a first identification address to the initial draft document for accessing the initial draft document, in response to determining the first identification address has not been assigned to the initial draft document, displaying, by the client terminal, the initial draft document on the client terminal, receiving, by the telecommunication server, user data from the client terminal, and saving the received user data in the initial draft document;

in response to determining, by the telecommunication server, that the set of user data has been completely received, setting, by the telecommunication server, the status parameter to the second value, copying, by the telecommunication server, the initial draft document into the electronic document, assigning, by the telecommunication server, a second identification address to the electronic document, for accessing the electronic document via the first telecommunication network, and deleting the initial draft document;

f) in response to determining that the status parameter has the second value or the third value, creating, by the telecommunication server, an edit draft copy of the electronic document in response to determining the edit draft copy has not been created, assigning, by the telecommunication server, a third identification address to the edit draft copy for accessing the edit draft copy, in response to determining the third identification address has not been assigned to the edit draft copy, setting the status parameter to the third value in response to determining the status parameter has the second value, displaying, by the client terminal, the edit draft copy on the client terminal, receiving, by the telecommunication server, modifications to the set of user data from the client terminal, and modifying, by the telecommunication server, the edit draft copy using the received modifications, and in response to receiving a save modification request from the client terminal, setting, by the telecommunication server, the status parameter to the second value, copying, by the telecommunication server, the edit draft copy into the electronic document, and deleting, by the telecommunication server, the edit draft copy; and g) repeating each of the operations c)-f) in one or more consecutive communication sessions between the client terminal and the telecommunication server using at least one of the first, second and third identification addresses, wherein the first, second, and third identification addresses are generated in accordance with a communication protocol of the first telecommunication network that is used by the client terminal, each of the first, second, and third identification addresses is one of an IP address or a media access control (MAC) address, and the first, second, third values are different from each other, and the first, second, third identification addresses are different from each other.

2. The method of claim 1, wherein the receiving user data from the client terminal comprises:

downloading the initial draft document at the client terminal; and forwarding at least part of the user data to the telecommunication server via the first telecommunication network using a second portion of the first identification address, in response to determining that the client terminal is not connected to a network using a first portion of the first identification address for receiving at least part of the user data at the client terminal, the second portion including a network address generated in accordance with a communication protocol of the first telecommunication network.

3. The method of claim 1, wherein:

the receiving user data from the client terminal is performed using the first identification address; and the first identification address includes an address determined in accordance with a communication protocol of a second telecommunication network to which the client terminal and the telecommunication server are connected.

4. The method of claim 3, wherein the first telecommunication network is a public network and the second telecommunication network is a private intranet network.

5. The method of claim 2, wherein the receiving of user data is performed in multiple login sessions to the client terminal from a user of the client terminal.

6. The method of claim 1, wherein the receiving user data or the receiving modifications to the set of user data from the client device includes receiving the user data or the modifications to the set of user data concurrently from multiple client terminals.

7. The method of claim 1, wherein the determining that the set of user data is completely received is performed automatically or upon receiving a completion notification from the client terminal.

8. The method of claim 1, wherein the receiving modifications to the set of user data comprises:

downloading the edit draft copy at the client terminal; and in response to determining that the client terminal is not connected to a network using a first portion of the third identification address for receiving at least part of the modifications at the client terminal, forwarding the at least part of the modifications to the telecommunication server via the first telecommunication network using a second portion of the third identification address, the second portion including a network address generated in accordance with a communication protocol of the first telecommunication network.

9. The method of claim 1, further comprising:

determining by the client terminal that the first telecommunication network is an untrusted network; and sending by the client terminal the modifications and the user data using the third identification address and the first identification address, the first and third identification addresses including addresses determined in accordance with a communication protocol of a second telecommunication network to which the client terminal and the telecommunication server are connected, wherein the second telecommunication network is a private network.

10. A telecommunication server in communication with at least one client terminal, the telecommunication server connected to the client terminal via at least a first telecommunication network, the telecommunication server configured to communicate with the client terminal via a stateless protocol, the telecommunication server comprising:
a memory configured to store computer-readable instructions; and
one or more processors configured to execute the computer-readable instructions such that the one or more processors are configured to,
provide, by the telecommunication server, an electronic document having a plurality of input fields for entry of a set of user data to the client terminal via the first telecommunication network,
store a status parameter in association with the electronic document, the status parameter having a first value, a second value, or a third value, the first value indicating a first state of the electronic document in which the electronic document does not contain user data, the second value indicating a second state of the electronic document in which the electronic document is filled with the set of user data, the third value indicating a third state of the electronic document in which the electronic document is being requested for modifying at least part of the set of user data,
receive a request from the client terminal to access the electronic document,
set the status parameter to the first value in response to determining the received request is a first request to access the electronic document,
in response to determining that the status parameter has the first value,
create an initial draft document including content of the electronic document in response to determining the initial draft document has not been created,
assign, by the telecommunication server, a first identification address to the initial draft document for accessing the initial draft document, in response to determining the first identification address has not been assigned to the initial draft document,
send the initial draft document to the client terminal and control the client terminal to display the initial draft document,
receive user data from the client terminal, and
save the received user data in the initial draft document;
in response to determining that the set of user data has been completely received,
set the status parameter to the second value,
copy by the telecommunication server the initial draft document into the electronic document,
assign, by the telecommunication server, a second identification address to the electronic document, for accessing the electronic document via the first telecommunication network, and
delete the initial draft document,
in response to a determination that the status parameter has the second value or the third value,
create an edit draft copy of the electronic document in response to determining the edit draft copy has not been created,
assign a third identification address to the edit draft copy for accessing the edit draft copy, in response to determining the third identification address has not been assigned to the edit draft copy,
set the status parameter to the third value in response to determining the status parameter has the second value,
send the edit draft copy to the client terminal,
control the client terminal to display the edit draft copy,
receive modifications to the set of user data from the client terminal, and
modify the edit draft copy using the received modifications,
in response to receiving a save modification request from the client terminal,
set the status parameter to the second value,
copy by the telecommunication server the edit draft copy into the electronic document, and
delete the edit draft copy,
wherein the first, second, and third identification addresses are generated in accordance with a communication protocol of the first telecommunication network that is used by the client terminal,
each of the first, second, and third identification addresses is one of an IP address or a media access control (MAC) address, and
the first, second, third values are different from each other, and the first, second, third identification addresses are different from each other.

11. A non-transitory computer-readable storage medium storing a computer program, which when executed by a computer, configures to the computer to:
provide an electronic document having a plurality of input fields for entry of a set of user data to a client terminal via a first telecommunication network;
store a status parameter in association with the electronic document, the status parameter having a first value, a second value, or a third value, the first value indicating a first state of the electronic document in which the electronic document is not filled, the second value indicating a second state of the electronic document in which the electronic document is filled with the set of user data, the third value indicating a third state of the electronic document in which the electronic document is being requested for modifying at least part of the set of user data;
receive a first request from the client terminal to access the electronic document, and in response to the first request,
create an initial draft document, the initial draft document including content of the electronic document,
assign a first identification address to the initial draft document for accessing the initial draft document,
send the initial draft document to the client terminal,
receive user data from the client terminal via the first identification address, and save the received user data in the initial draft document, and
in response to determining that the set of user data is completely received, copy the initial draft document into the electronic document, assign a second identification address to the electronic document for accessing the electronic document, and delete the initial draft document,
receive a second request from the client terminal to access the electronic document, wherein an entirety of the input fields of the electronic document have been filled with the set of user data, and in response to the second request,
create an edit draft copy of the electronic document and assign a third identification address to the edit draft copy for accessing the edit draft copy, send the edit draft copy to the client terminal,
receive modifications to the set of user data from the client terminal via the third identification address,
modify the edit draft copy using the received modifications, and
copy the edit draft copy into the electronic document and delete the edit draft copy in response to receiving a save modification request from the client terminal;
wherein the first, second, and third identification addresses are generated in accordance with a communication protocol of the first telecommunication network that is used by the client terminal,
each of the first, second, and third identification addresses is one of an IP address or a media access control (MAC) address, and
the first, second, third values are different from each other, and the first, second, third identification addresses are different from each other.

12. The non-transitory computer-readable storage medium of claim 11, wherein the computer program, which when executed by the computer, further configures the computer to receive the second request via one of the second identification address and the first identification address.

13. The non-transitory computer-readable storage medium of claim 11, wherein the computer program, which when executed by the computer, further configures the computer to receive the user data from the client terminal by:
downloading the initial draft document at the client terminal; and
forwarding at least part of the user data to a server via a first network using a second portion of the first identification address in response to determining that the client terminal is not connected to a network using a first portion of the first identification address for receiving the at least part of the user data at the client terminal, the second portion including a network address generated in accordance with a communication protocol of the first network.

14. The non-transitory computer-readable storage medium of claim 11, wherein:
the computer program, which when executed by the computer, further configures the computer to receive the user data from the client terminal using the first identification address; and
the first identification address includes an address determined in accordance with a communication protocol of a second network to which the client terminal and the computer are connected.

15. The non-transitory computer-readable storage medium of claim 11, wherein the computer program, which when executed by the computer, further configures the computer to receive at least one of the user data and the modifications to the set of user data concurrently from multiple client terminals.

16. The non-transitory computer-readable storage medium of claim 11, wherein the computer program, which when executed by the computer, further configures the computer to determine that the set of user data is completely received is performed automatically or upon receiving a completion notification from the client terminal.

* * * * *